(12) United States Patent
Dumas et al.

(10) Patent No.: US 7,933,819 B2
(45) Date of Patent: Apr. 26, 2011

(54) COMPUTERIZED METHOD AND SYSTEM FOR CREATING A NEW BROKERAGE ACCOUNT

(75) Inventors: Michael H. Dumas, Jacksonville, FL (US); Scott Ives, Charlotte, NC (US); Gerald Mizelle, Pointe Vedra Beach, FL (US); Mario Pascalev, Atlantic Beach, FL (US); Guruprasadh Ragothaman, Jacksonville, FL (US); Shane Witbeck, St. Augustine, FL (US)

(73) Assignee: Bank of America Corporation, Charlotte, NC (US)

(*) Notice: Subject to any disclaimer, the term of this patent is extended or adjusted under 35 U.S.C. 154(b) by 1468 days.

(21) Appl. No.: 10/905,099

(22) Filed: Dec. 15, 2004

(65) Prior Publication Data

US 2006/0143107 A1    Jun. 29, 2006

(51) Int. Cl.
*G06Q 40/00* (2006.01)
(52) U.S. Cl. .......................................................... 705/35
(58) Field of Classification Search .................. 705/35
See application file for complete search history.

(56) References Cited

U.S. PATENT DOCUMENTS

| | | | |
|---|---|---|---|
| 7,130,812 B1 | 10/2006 | Iyer et al. | |
| 2002/0133502 A1* | 9/2002 | Rosenthal et al. | 707/104.1 |
| 2002/0143686 A1* | 10/2002 | Greene et al. | 705/37 |
| 2002/0152106 A1* | 10/2002 | Stoxen et al. | 705/8 |
| 2002/0156720 A1 | 10/2002 | Chow et al. | |
| 2003/0115151 A1 | 6/2003 | Wheeler et al. | |
| 2006/0116949 A1* | 6/2006 | Wehunt et al. | 705/35 |

FOREIGN PATENT DOCUMENTS

| | | |
|---|---|---|
| WO | 02/075632 | 9/2002 |
| WO | 03/085495 | 10/2003 |

OTHER PUBLICATIONS

Rust, Roland T; Zeithaml, Valerie A; Lemon, Katherine N. Customer Equity. Simon & Shuster. 2000. pp. 101-102.*
Bank of America Corporation, International Application No. PCT/US05/45182, "International Preliminary Report on Patentability," Jun. 28, 2007.
Bank of America Corporation, International Application No. PCT/US05/45182, "International Search Report", Feb. 16, 2007.
Bank of America Corporation, International Application No. PCT/US05.45182, "Written Opinion", Feb. 16, 2007.

* cited by examiner

*Primary Examiner* — Jason M Borlinghaus
(74) *Attorney, Agent, or Firm* — Michael A. Springs; Moore & Van Allen PLLC

(57) ABSTRACT

A computerized system for creating a new brokerage account is disclosed. A new account wizard software component guides a user through a series of data collection procedures using a rules based engine to facilitate data collection processing according to a plurality of data collection rules that are stored in a database. A workflow management software component manages data transfers and delegates task assignments during creation of the new brokerage account. There is also an application programming interface layer software component for interfacing data transfers between the workflow management software component and external software components.

9 Claims, 7 Drawing Sheets

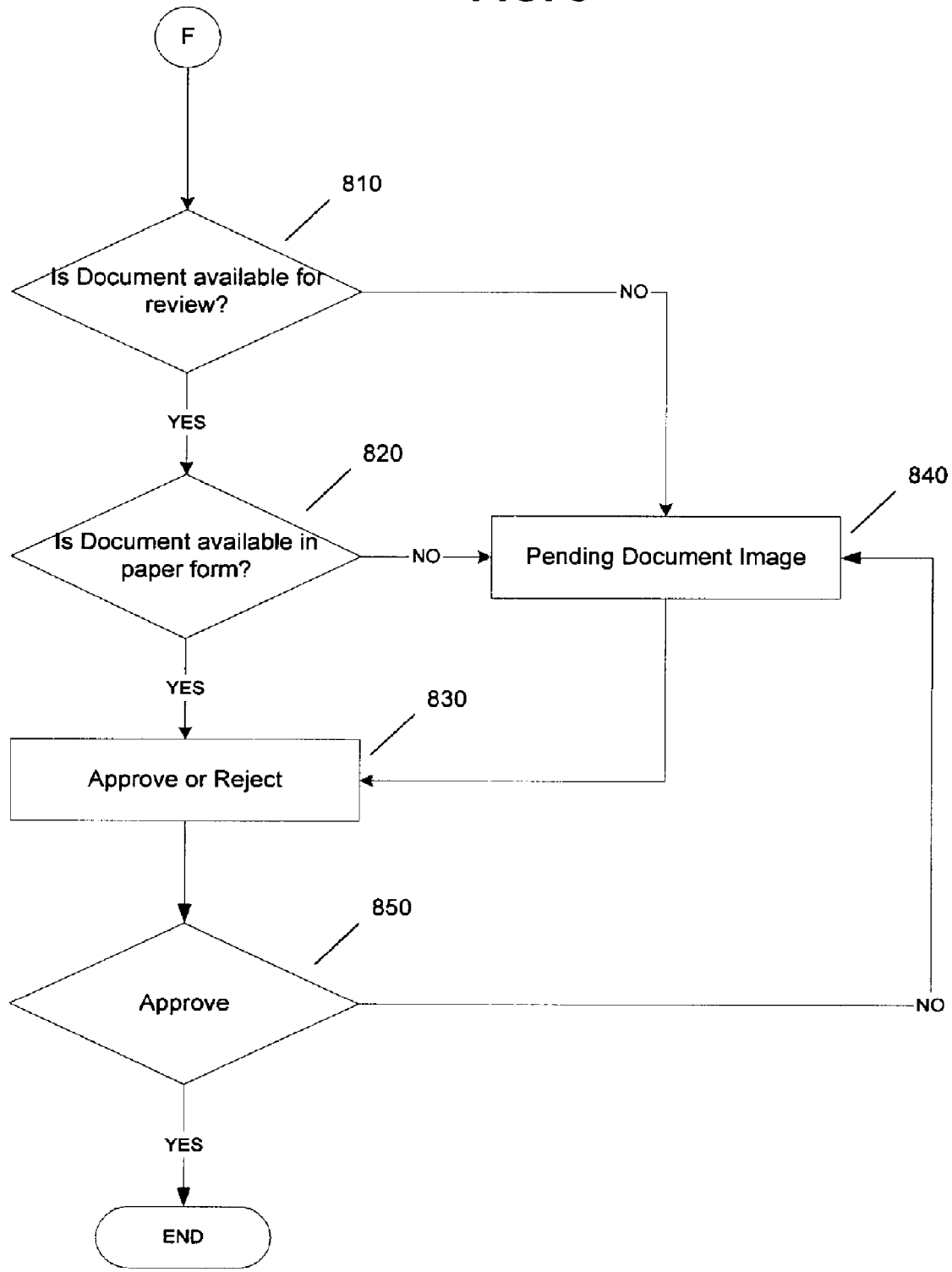

COMPUTERIZED METHOD AND SYSTEM FOR CREATING A NEW BROKERAGE ACCOUNT

BACKGROUND OF INVENTION

New brokerage account creation within the financial services industry is a critical function. Current account opening procedures are found to be lacking in that there are multiple redundant activities, quality control issues, and customer satisfaction issues related to account opening cycle time that need to be addressed. New account opening procedures generally rely heavily on manual intake of data that is then transferred (typically by fax) to another department for data entry into the financial institution's computer system. This process breeds documentation errors, incomplete documents, and extensive paper handling that result in delays and communication errors that adversely affect new account setup.

What is needed is an automated on-line system and methodology that reduces account opening cycle time and data errors.

SUMMARY OF INVENTION

Embodiments of the present invention provide an on-line web based computerized system for creating a new brokerage account. A new account wizard software component guides a user through a series of data collection procedures using a rules based engine to facilitate data collection processing according to a plurality of data collection rules that are stored in a database. The user is presented with required and optional items of data to be collected based on previous data entries into the new account wizard until all requisite data has been collected. A workflow management software component manages data transfers, notifications, and delegates task assignments during creation of the new brokerage account using a rules based engine working in conjunction with a database of workflow rules and assignment rules to determine task assignments and data transfer destinations. There is also an application programming interface layer software component for interfacing data transfers between the workflow management software component and external software components.

BRIEF DESCRIPTION OF DRAWINGS

FIG. 8 is a flowchart illustrating a document tracking procedure used by the new account opening program.

DETAILED DESCRIPTION

Figure 1:
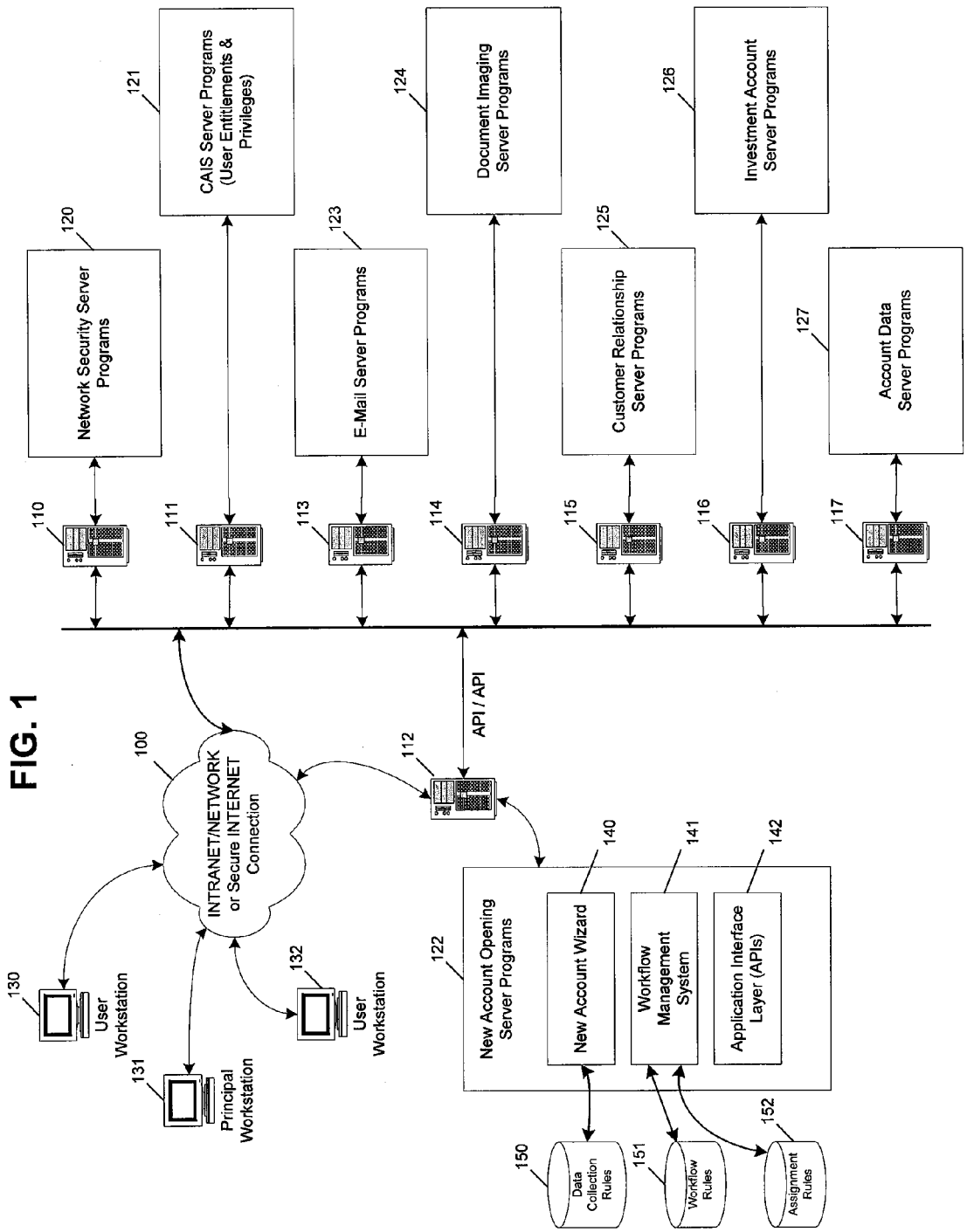
FIG. 1 is a block diagram illustrating the context and environment in which the present invention operates.

It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps. With respect to flow charts, block diagrams, and flow diagrams, not every possible signal flow, data path or process block is shown. Rather, for clarity, only those important to the inventive concepts being discussed relative to the drawing may be illustrated, although others may be discussed.

It should be understood that terms like "bank," "financial institution," and just "institution" are used herein in their broadest sense. Terms like bank and financial institution are intended to encompass all such possibilities, including but not limited to, finance companies, stock brokerages, credit unions, mortgage companies, manufacturers who grant loans to secure the purchase of goods, finance companies, computer companies, etc. Additionally, disclosed embodiments may suggest or illustrate the use of agencies or contractors external to the financial institution to perform some of the calculations and data repository services. These illustrations are examples only, and an institution or business can implement the entire invention on their own computer systems or even a single work station if appropriate databases are present and can be accessed.

FIG. 1 is a block diagram illustrating an example context and environment in which the new account opening program of the present invention operates. The new account opening program is based in a computer network, more specifically in the embodiment, a corporate intranet network for a banking or financial institution. A goal or purpose of the new account opening program is to develop a intranet based on-line new account opening system and methodology that enables front-end office personnel to do the bulk of new account creation work. New account creation under the present embodiment is based on user entered criteria which causes decisions for routing of data and assignment of tasks to be automated. The new system will also make the account creation process more efficient and accurate by reducing the number of "not in good order" (NIGO) account applications. This will be achieved through an integrated rules based software system that manages data collection and delegates tasks and assignments to the appropriate personnel. The new account opening program of the present invention is but one software program of many existing software programs resident on the bank's computer intranet. The new account opening program is designed to interface and communicate with many of the other software programs whenever the rules and data require.

The bank's intranet/network 100 serves as the center for all activity. The intranet/network 100 physically connects a collection of computer servers 110-117 that host various software applications 120-127 and databases 150-152. In addition, the intranet supports a plurality of workstations 130-132 that can access the various servers, software programs, and databases.

For ease of illustration and description, many of the servers illustrated in FIG. 1 have been individually labeled to describe the functions they perform. This is not a requirement as multiple different software programs can be resident within a single server. In addition, the entire network has not been shown in FIG. 1. There are many additional items of hardware and software that run on the network that do not have a direct impact on the present invention. One example would be print servers.

There is shown a network security server 110 that is responsible for ensuring that only authorized users can access the network and its contents via a network security application 120. A central associate information system (CAIS) server 111 is responsible for storing the access privileges and permissions for each network user 121 with respect to each network resource including software programs. There is also a new account opening server 112 that hosts the software and supporting databases of the present invention 122. An e-mail server 113 is utilized to manage the automated e-mail requirements 123 of the present invention 122. A document imaging server 114 is utilized to manage the document imaging requirements 124 of various software programs including the present invention. A customer relationship server 115 hosts customer relationship software and data 125 that can be accessed and used during new account setup to obtain personal information for an applicant that may currently exist in the system such as legal name, address, taxpayer ID, and the like. An investment account creation server 116 that is outside of network 100 creates and maintains custody of new accounts. An account data server 117 contains reporting data for investment customers that the present invention updates when necessary.

The present embodiment of the invention is comprised of software defining a methodology that is hosted by the new account opening server 112. The contents of server 112 are described in the call out box 122 and include a new account opening program wizard 140 that accesses wizard rules database 150, a workflow management system 141 that accesses workflow rules 151 and assignment rules 152 databases, and an application program interface layer 142 for communicating with other software programs on the network. Although the software is represented by a callout box 122, it should be noted that any or all software used in implementing the present invention can be stored on a media such as a computer program product.

Figure 2:
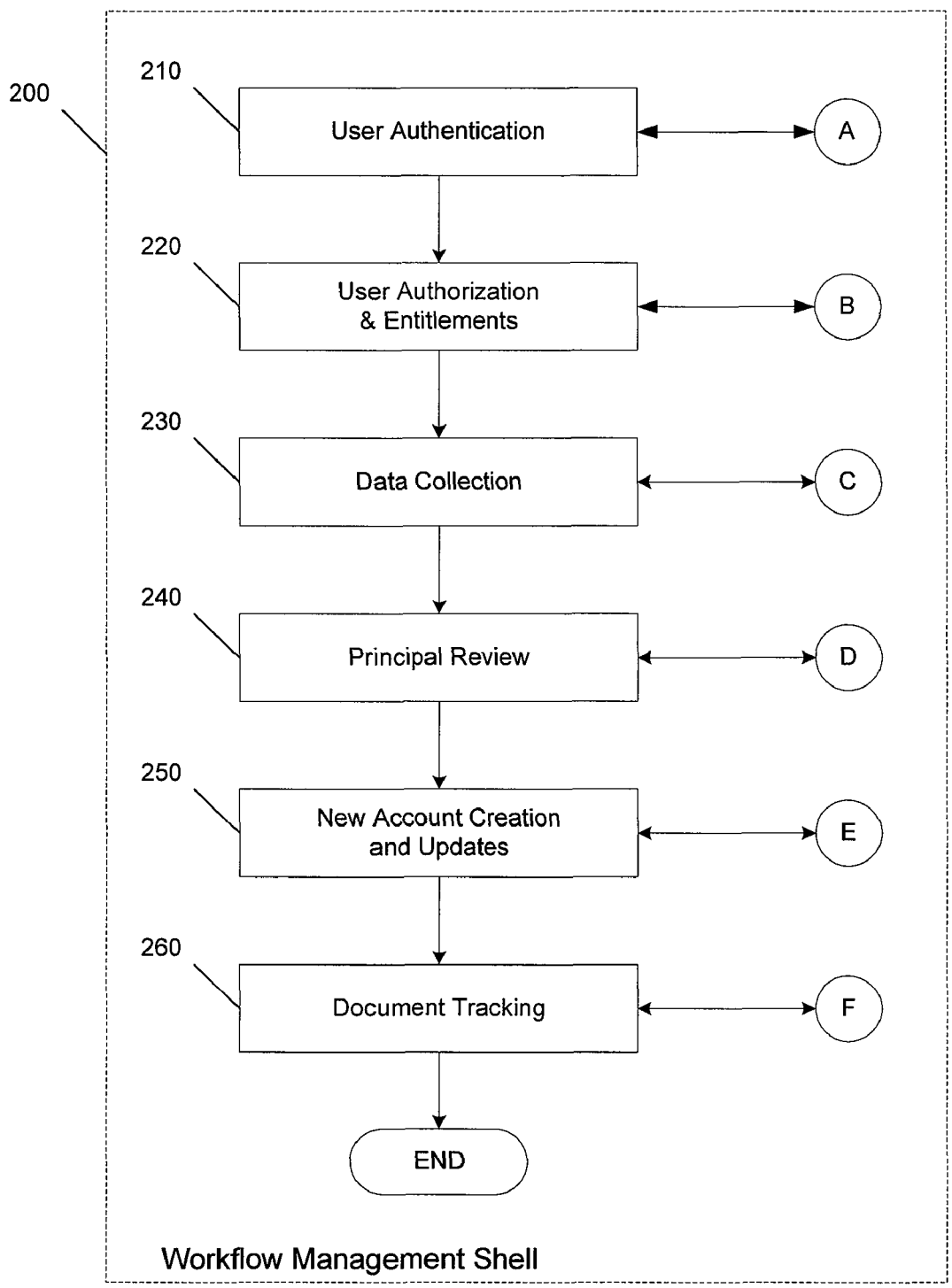
FIG. 2 is a flowchart illustrating the major functions performed by the present invention under the umbrella of a workflow management system.

FIG. 2 is a flowchart illustrating the major functions and processes performed by the present embodiment under the umbrella of the workflow management system. The workflow management shell or umbrella 200 guides and controls the various processes used to create a new account. The workflow management shell 200 utilizes a workflow rules database and an assignment rules database to define and delegate tasks and track progress during the creation of a new account. The assignment rules provide for the assignment of tasks to the appropriate responsible individuals. The workflow rules define and control the process from start to finish including sending of appropriate e-mail notifications, and highlighting and presenting items in a priority sequence.

Each process is briefly introduced and will be described in greater detail with reference to subsequent figures. The first process illustrated is a general login procedure 210 used by bank employees to access, via a workstation, the bank's corporate intranet that hosts the hardware, software, storage media, etc . . . that comprise the bank's computer network. The software includes the new account opening program that is the subject of the present invention. The next procedure is a specific authorization procedure 220 that enables the user to access and execute all or a portion of the new account opening program based on that user's individual entitlements as defined by the network administrator. Once the user has launched the new account opening program, the first process of the new account opening program is a data collection process 230. Data collection 230 is followed by Principal review 240 in which an authorized manager reviews the data collected by the submitting user and either accepts or rejects the account application on its merits. If an application passes Principal review, the next step is to create the new account 250. There is also a document tracking procedure 260 that is responsible for maintaining a record of new account documents.

Figure 3:
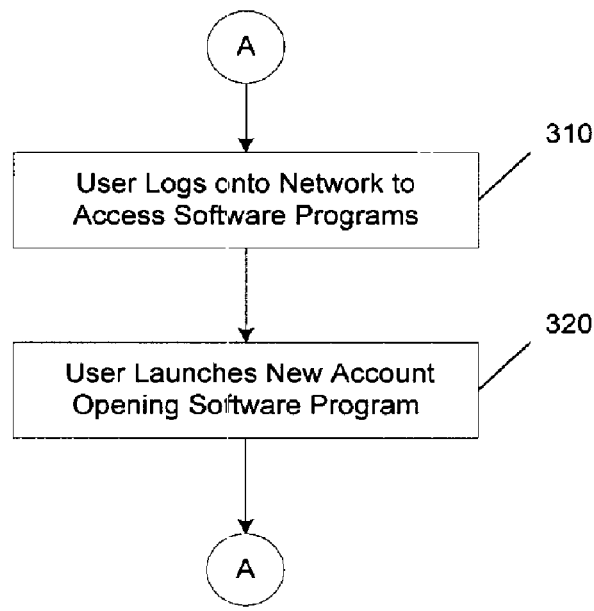
FIG. 3 is a flowchart illustrating a general login procedure to access the software programs available within the network.

FIG. 3 is a flowchart illustrating a general login procedure 210 to access the applications available within the network. Prior to accessing and executing the new account opening program, however, an individual user must be authenticated via a login procedure 310. The login procedure generally involves entering a username in conjunction with a password. Other types of authentication or verification can be implemented depending on the level of security desired by the network administrator. Upon a successful general login, the user can navigate the operating system to locate and launch 320 the new account opening program.

Figure 4:
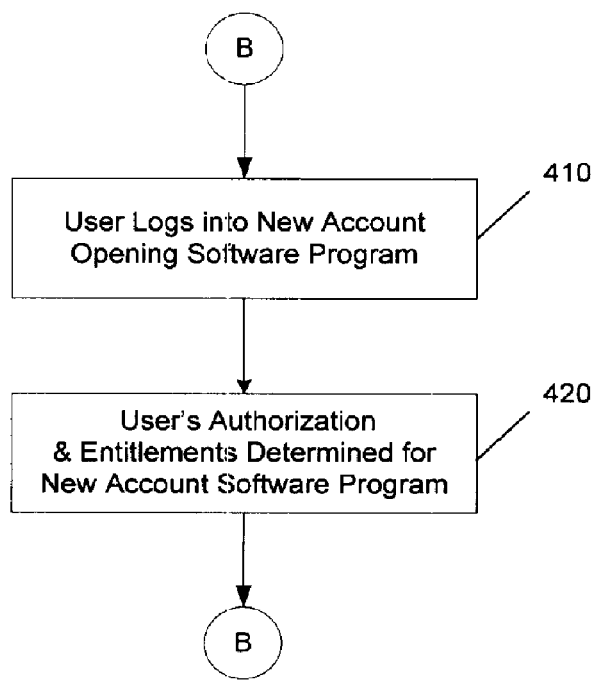
FIG. 4 is a flowchart illustrating a specific login and entitlement determination procedure to access the new account opening program available within the network.

FIG. 4 is a flowchart illustrating a specific login and entitlement determination procedure 220 to access the new account opening program available within the network. Once the user has launched the new account opening program 320 the network security information is passed to the present invention to identify the user so that his entitlements for the new account opening program can be determined 420. Among other things, entitlements refer to the authority the user has over the data. Based on certain entitlements, the user may or may not be allowed to perform certain functions within the new account opening program.

Figure 5:
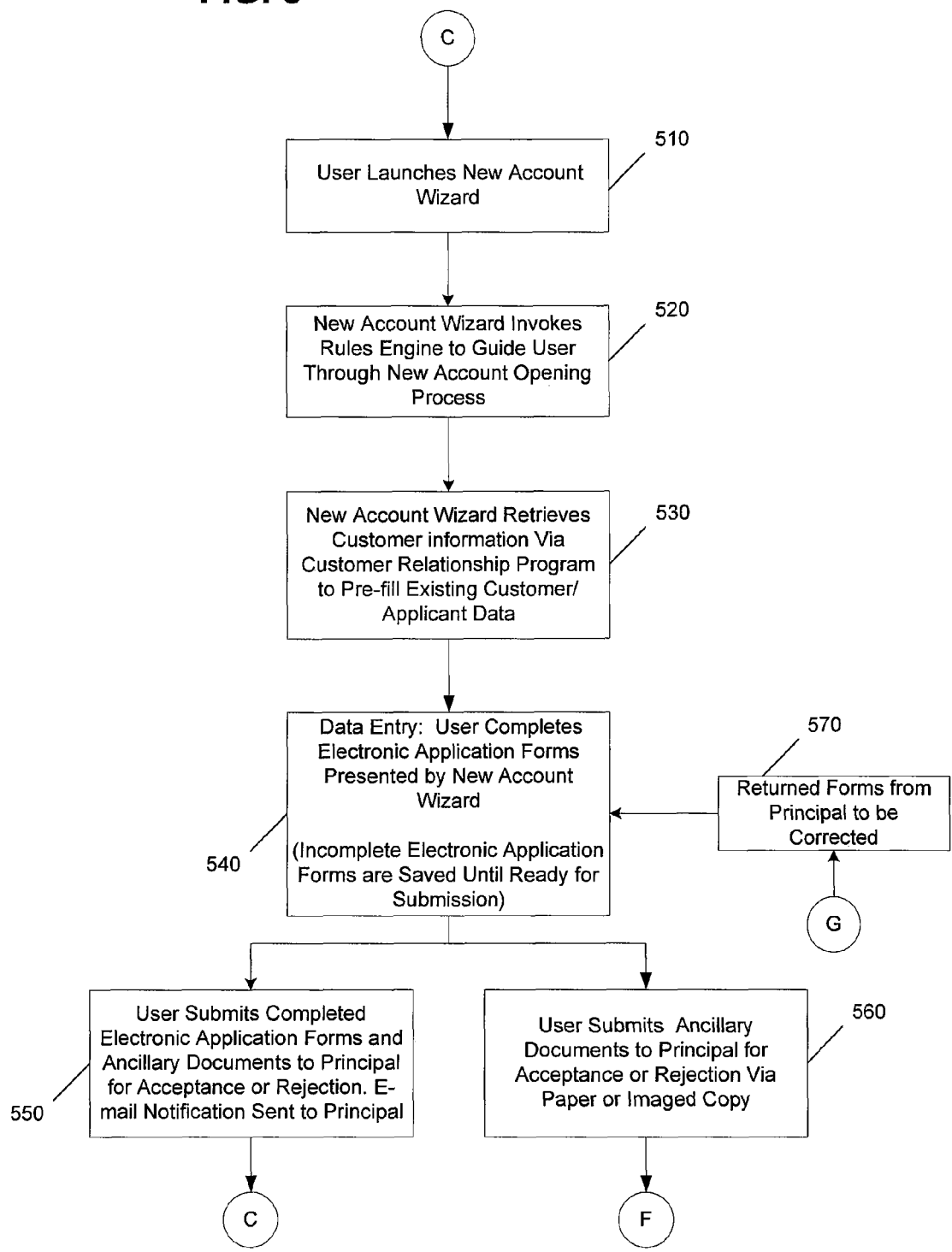
FIG. 5 is a flowchart illustrating a data collection procedure used by the new account opening program.

FIG. 5 is a flowchart illustrating a data collection procedure used by the new account opening program. Once the user has logged in and started the new account opening program he can launch the new account wizard 510. The new account wizard guides the user through the steps used to collect data for purposes of opening a new brokerage account. The new account wizard utilizes a rules based engine to guide the user through the data collection process 520. The new account wizard will display only valid data options and data fields that must be completed on behalf of the account applicant. The wizard rules engine in conjunction with a data collection rules database presents data options and fields based on previous data entries. For instance, if the user has selected an account registration type that is associated with a tax-deferred account, then the wizard will only present fields and options relating to tax-deferred accounts and not taxable accounts. This is but one example of the wizard dynamically adapting the new account data collection process based on previous data entries. The wizard utilizes the Customer Relationship program to identify existing relationships with the customer/account applicant. If a relationship exists, the program pre-fills the wizard screens with name and address information 530. The wizard automatically displays new screens or windows of data fields for the user to complete until all of the requisite information pertaining to the account applicant has been completed 540. The data collected is appropriately placed into electronic forms. Any partially complete account applications are saved until such time that they are completed 540 before the user submits the completed account application and any ancillary documentation to a Principal for account review 550 and document review 560. As will be described below, sometimes account applications and/or documents will be returned to the user by the Principal for further action 570.

Figure 6:
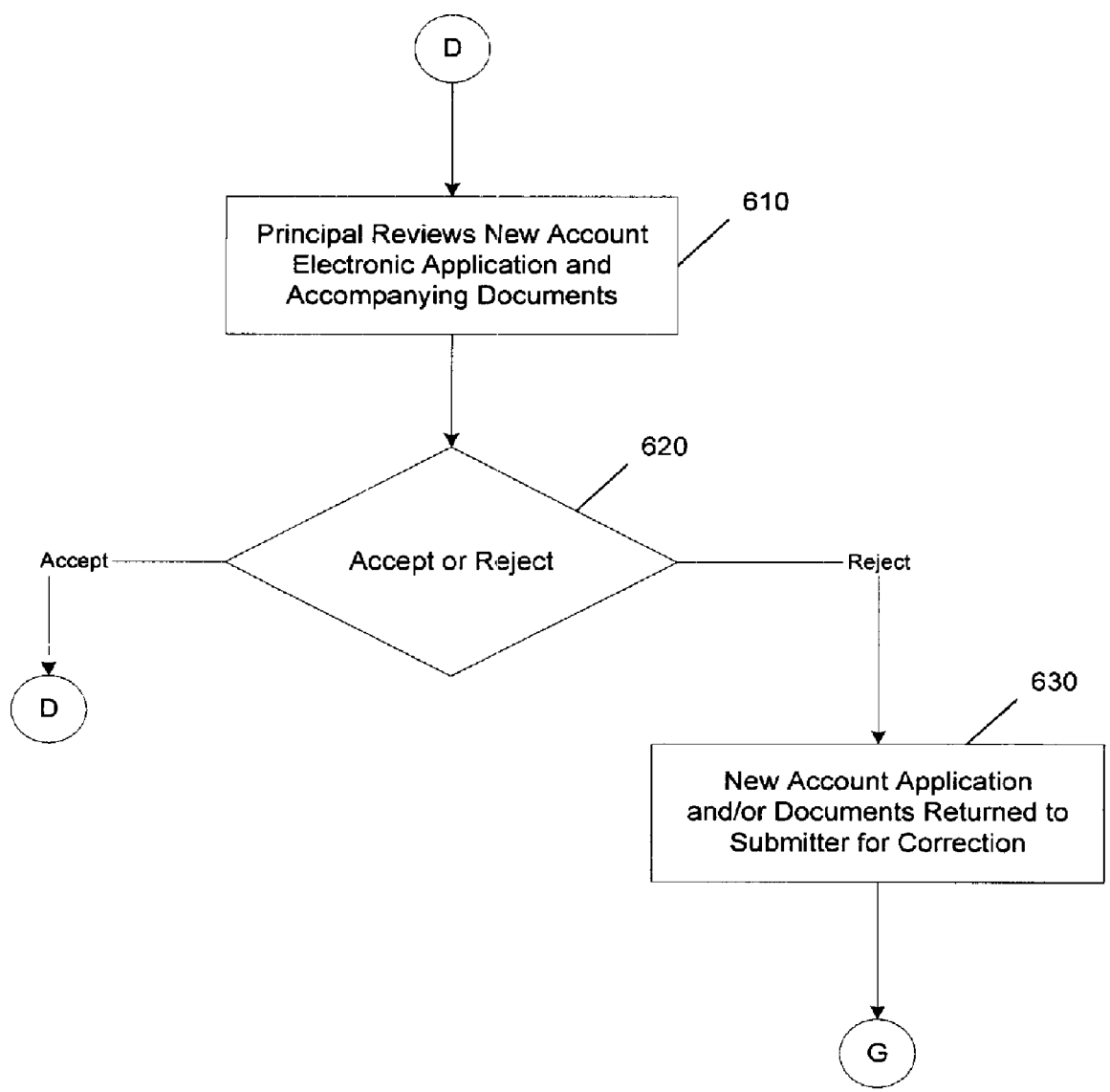
FIG. 6 is a flowchart illustrating a Principal review procedure used by the new account opening program.

FIG. 6 is a flowchart illustrating a Principal review procedure used by the new account opening program. A Principal user is a user having authority to accept or reject the new account application on behalf of the bank. When the originating user has completed an account application for a new account applicant, the workflow management system automatically forwards the forms to a Principal user for review.

The Principal user conducts a review of the forms and any supporting documentation 610. The Principal user then makes a judgment to either accept or reject the application on its merits 620. If the account application is accepted it will be forwarded to the new account creation process 250. If the account application is rejected, however, it will be returned to the originating user for correction 630 or other further action.

Figure 7:
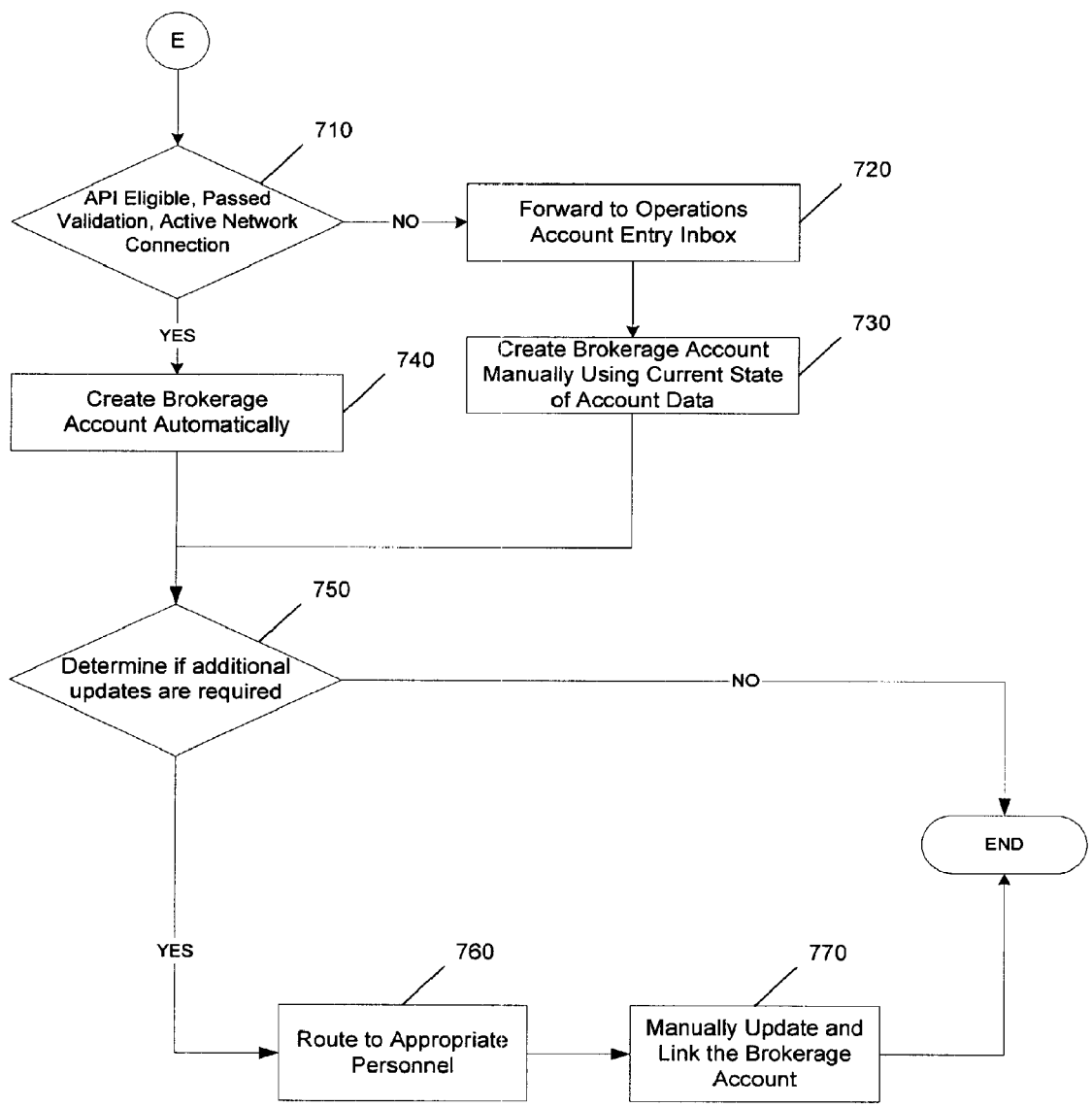
FIG. 7 is a flowchart illustrating an account creation procedure used by the new account opening program.

FIG. 7 is a flowchart illustrating an account creation procedure used by the new account opening program. Once the account application has cleared Principal review, it is eligible for creation. The first step is to determine if the account data is API eligible, has passed validation tests, and whether there is an active network connection to the account creation program 710. API refers to an application program interface. This step ensures that the data is in the proper format for the account creation program. The account creation program is an existing program currently in use. The present invention collects, prepares, and formats data for the existing account creation program.

If the account data is not API eligible, the account information is forwarded via the workflow management system 200 to an operations account entry inbox 720. Operations account entry refers to a functional group of individuals that are responsible for manually creating an account that cannot be created automatically by the account creation program. In such cases the new account will be manually created using the data that was included 730. If the account data is API eligible then the account creation program will automatically create the account in the bank' system 740. At this point a check is performed to determine whether additional updates are required for account completion. If so, the workflow management system will notify a user within a group responsible for updating accounts and forward the new account information to such user 760. The user then manually updates and links the new brokerage account appropriately 770.

FIG. 8 is a flowchart illustrating a document tracking procedure used by the new account opening application 260. Once the Principal approves an account, the present invention takes them to a document review application. If a paper document is available 810, 820, the Principal can approve or reject it 830, 850. If the New Account Creation process 250 is also complete, approving all the documents 850 will complete the entire process. If the document is unavailable in paper form, or if it is rejected either in paper or in electronic form, the present invention will consider the document collection incomplete, until the document is imaged 840 and approved. A user group known as document trackers further monitors outstanding issues to ensure completion.

The foregoing describes each of the components that comprise the present invention. What follows now is a description of an example new account opening using FIG. 1 as a reference.

A junior level front office employee will log-in to the bank's intranet computer network 100 via a user workstation 130. For ease of description, this person will be referred to as a junior user. The junior user will complete the network login via server 110 and network security server programs 120. Once logged in to the network 100, the junior user will navigate the operating system to locate the "new account opening" main software program 122 which resides on server 112. Upon launching the "new account opening" main software program 122 the junior user's identity will be processed by the central associate information system (CAIS) software programs 121 that reside on server 111. The CAIS programs 121 process the junior user's ID and apply a set of privileges or entitlements to that the junior user has while working within the new account opening program 122.

The junior user is now ready to execute the new account wizard component 140 of the new account opening program 122. The new account wizard 140 guides the junior user through a plurality of data collection procedures. The new account wizard 140 utilizes a rules based engine to facilitate data collection processing according to a plurality of data collection rules that are stored in a database 150. The wizard presents data fields to the junior user via a series of electronic data collection forms. Each time the junior user enters a piece of data, the rules engine processes it and dynamically adjusts to present the next required piece of data. Certain previous data entries may eliminate the need to enter other data. In such cases the rules engine will shade out or remove those entries such that the user is only presented with items of data that need to be collected based. This continues until all requisite data has been collected.

The new account opening program is controlled or managed by a workflow management component 141. The workflow management component utilizes a database of workflow rules 151 and assignment rules 152 to provide logistical support for the new account opening program. Logistical support includes routing or delegating tasks to appropriate personnel such that the new account application is efficiently moved along and not allowed to languish unattended. The workflow management component 141 is also the gateway between the new account opening program 122 and external programs that depend on the data generated by the new account opening program 122. To facilitate interaction with external components an application interface layer 142 comprising a plurality of application programming interfaces (APIs) is part of the new account opening program 122. The term "application" when used in conjunction with "interface" refers to software. In all other instances the term "application" refers to an "account application".

At the conclusion of data collection, the junior user will forward the collected data and any ancillary documentation for Principal review. Principal review means that a more senior level employee will review the data and decide whether to accept or reject the new account application. The data is forwarded with an assist from the workflow management component 141. The junior user completes the activity and the workflow management component 141 assigns the task to an available Principal reviewer. The workflow management component 141 in conjunction with its associated workflow rules database 151 and assignment rules database 152 will automatically assign a Principal to review the account application data and place the requisite data in their "electronic inbox" 122 and will send automated e-mail notifications using e-mail programs 123.

The Principal will manually conduct a review of the data and either accept or reject the application. A rejection will cause the workflow management component to return the data to the submitting junior user for correction or further action. An acceptance invokes the "account creation" stage of the new account opening program 122.

To actually create the new account, the workflow management component 141 via application interface layer 142 presents the data to an external component whose task is to create the account based on the supplied data. If the account application has been approved but the data is not API eligible or validation or connectivity errors occur, the workflow management component 141 will route the data and assign the task of creating the account manually to the appropriate personnel. If the account data is application programming interface (API) eligible and no validation or connectivity errors occur the account will automatically be created by the appropriate external component. Once the account has been created a subsequent check is made to determine if additional updates or information need to be applied to the new account. If so, the workflow management component 141 will forward the account and assign the task of manually updating the account to the appropriate personnel.

As previously discussed, it should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media could be a fixed storage media, but it could just as easily be a removable optical or magnetic disc or tape. The computer program instructions can reside on any medium that can contain, store, communicate, propagate, or transport computer program code for execution by any type of computing platform, instruction execution system, or collection of such systems interconnected via a buss or network. Such a computer readable medium may be, for example, but not limited to, an electronic, magnetic, optical, electromagnetic, infrared, or semiconductor system or device.

Computer program instructions which implement all or a portion of the invention may also be embodied in a stream of information being retrieved over a network such as the Internet. Note that the computer usable or computer readable medium could even be paper or another suitable medium upon which computer program code is printed, as the code can be electronically captured via, for instance, an optical scan, then compiled and interpreted, or otherwise processed in a suitable manner.

Specific embodiments of an invention are disclosed herein. One of ordinary skill in the computing and financial arts will quickly recognize that the invention has other applications in other environments. Many embodiments are possible. The following claims are in no way intended to limit the scope of the invention to the specific embodiments described above.

What is claimed is:

1. A computerized method for creating a new brokerage account within a financial institution, the method comprising:
    providing a new account wizard software component which invokes a rules engine to guide a user through a new account opening process comprising:
        creating a new account application;
        prompting the user to select a new account type;
        searching, one or more of the financial institution's databases, for an applicant's pre-existing customer information from; retrieving the applicant's pre-existing customer information from one or more of the financial institution's databases if it exists; pre-filling the new account application data fields with data derived from the new account type selected and the applicant's pre-existing customer information;
        guiding the user through a series of continuously and dynamically adapted data collection procedures that display valid data options and data fields, wherein the data options and data fields are dynamically adapted based on the user's previous entered data entries; and
    providing a workflow management system which accesses workflow rules to provide automated routing of data and accesses assignment rules to provide automated assignment of new account creation tasks to appropriate individuals, wherein the automated routing and automated assignment are determined based on the corresponding rules and user-entered data collected by the new account wizard software component.

2. The computerized method of claim 1, further comprising saving the new account application at any point in the process.

3. The computerized method of claim 1, further comprising submitting the completed new account application to a principal for review based on the automated assignment of new account creation tasks to appropriate individuals.

4. The computerized method of claim 1, further comprising providing restricted access to the new account wizard software component.

5. A computerized system for creating a new brokerage account within a financial institution, the system comprising:
    a new account wizard software component which invokes a rules engine to guide a user through a new account opening process comprising:
        creating a new account application;
        prompting the user to select a new account type;
        searching, one or more of the financial institution's databases, for an applicant's pre-existing customer information; retrieving the applicant's pre-existing customer information from one or more of the financial institution's databases if it exists; pre-filling the new account application data fields with data derived from the new account type selected and the applicant's pre-existing customer information;
        guiding the user through a series of continuously and dynamically adapted data collection procedures that display valid data options and data fields, wherein the data options and data fields are dynamically adapted based on the user's previous entered data entries; and,
    a workflow management system which accesses workflow rules to provide automated routing of data and accesses assignment rules to provide automated assignment of new account creation tasks to appropriate individuals, wherein the automated routing and automated assignment are determined based on the corresponding rules and user-entered data collected by the new account wizard software component.

6. The computerized system of claim 5, further comprising saving the new account application at any point in the process.

7. The computerized system of claim 5, further comprising submitting the completed new account application to a principal for review based on the automated assignment of new account creation tasks to appropriate individuals.

8. The computerized system of claim 5, further comprising providing restricted access to the new account wizard software component.

9. A computer program product embodied on a computer readable storage medium and including computer program code for creating a new brokerage account within a financial institution, the computer program code comprising:
    instructions for guiding a user through a new account opening process comprising:
        creating a new account application;
        prompting the user to select a new account type;
        searching, one or more of the financial institution's databases, for an applicant's pre-existing customer information; retrieving the applicant's pre-existing customer information from one or more of the financial institution's databases if it exists; pre-filling the new account application data fields with data derived from the new account type selected and the applicant's pre-existing customer information;
        guiding the user through a series of continuously and dynamically adapted data collection procedures that display valid data options and data fields, wherein the data options and data fields are dynamically adapted based on the user's previous entered data entries; and instructions for accessing workflow rules to provide automated routing of data and assignment rules to provide automated assignment of new account creation tasks to appropriate individuals, wherein the automated routing and automated assignment are determined based on the corresponding rules and user-entered data collected by the new account wizard software component.

* * * * *